(12) United States Patent
Jaquette

(10) Patent No.: US 6,816,093 B1
(45) Date of Patent: Nov. 9, 2004

(54) APPARATUS METHOD AND SYSTEM FOR INCREASED DIGITAL MEDIA RECORDING THROUGHPUT

(75) Inventor: Glen Alan Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/726,941

(22) Filed: Dec. 3, 2003

(51) Int. Cl.[7] ............................................. H03M 7/00
(52) U.S. Cl. ........................................ 341/51; 341/50
(58) Field of Search ............................. 341/50, 51, 87, 341/95

(56) References Cited

U.S. PATENT DOCUMENTS

| | | | |
|---|---|---|---|
| 4,049,917 A | | 9/1977 | Copperi et al. ......... 179/15 AP |
| 4,929,946 A | * | 5/1990 | O'Brien et al. ............... 341/87 |
| 5,097,261 A | | 3/1992 | Langdon, Jr. et al. ........ 341/51 |
| 5,109,226 A | * | 4/1992 | MacLean et al. ............. 341/95 |
| 5,167,034 A | | 11/1992 | MacLean, Jr. et al. ...... 395/575 |
| 5,226,156 A | | 7/1993 | MacLean, Jr. et al. ...... 395/600 |
| 5,412,429 A | | 5/1995 | Glover ....................... 348/398 |
| 5,561,421 A | | 10/1996 | Smith et al. .................. 341/51 |
| 5,729,228 A | | 3/1998 | Franaszek et al. .......... 341/106 |
| 5,751,694 A | | 5/1998 | Toft .......................... 370/109 |
| 5,809,176 A | | 9/1998 | Yajima ....................... 382/247 |
| 6,208,273 B1 | | 3/2001 | Dye et al. .................... 341/51 |
| 6,215,903 B1 | | 4/2001 | Cook ......................... 382/232 |
| 6,320,521 B1 | | 11/2001 | Har et al. ..................... 341/50 |

OTHER PUBLICATIONS

Laksono (U.S. application No. 09/990,976) "A system and method for multiple channel video transcoding", filed on Nov. 21, 2001.*

"Design considerations for the ALDC cores" by M. J. Slattery and F. A. Kampf, 1998 IBM, http://www.research.ibm.com/journal/rd/426/slattery.txt.

* cited by examiner

*Primary Examiner*—Jean Bruner Jeanglaude
(74) *Attorney, Agent, or Firm*—Kunzler & Associates

(57) ABSTRACT

A source data stream is distributed to two or more compression paths that provide a corresponding number of compressed data streams that are concurrently encoded onto a recording medium as a set of media tracks. In one embodiment, buffer space within each compression path is monitored and the source data stream is directed to a 'starved' compression path. Metadata is inserted into the compressed data streams to facilitate reconstruction of the source data stream from the compressed data streams. The source data stream may be reconstructed by concurrently decoding the media tracks, decompressing the compressed data streams to a corresponding set of decompressed data streams, and merging the decompressed streams into an output data stream as directed by the metadata. The present invention overcomes the bottlenecks and other issues previously associated with context-based compression within digital media recording systems.

30 Claims, 6 Drawing Sheets

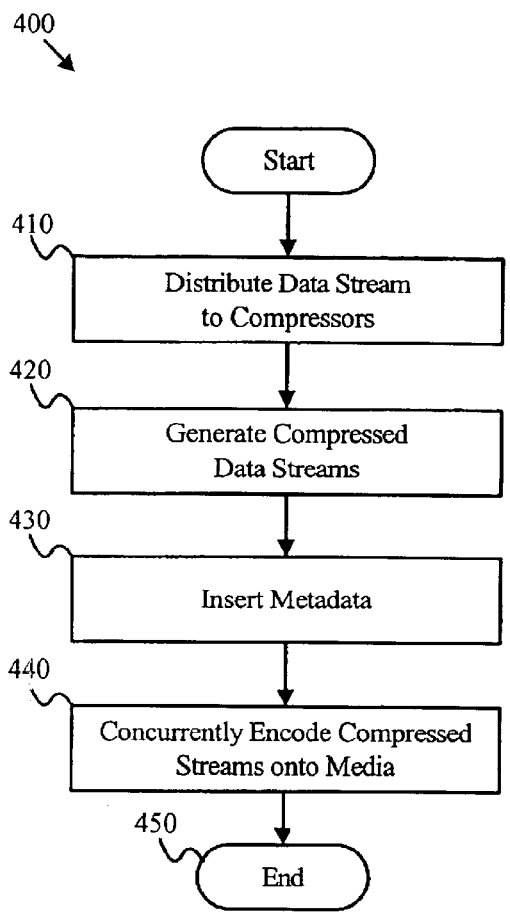
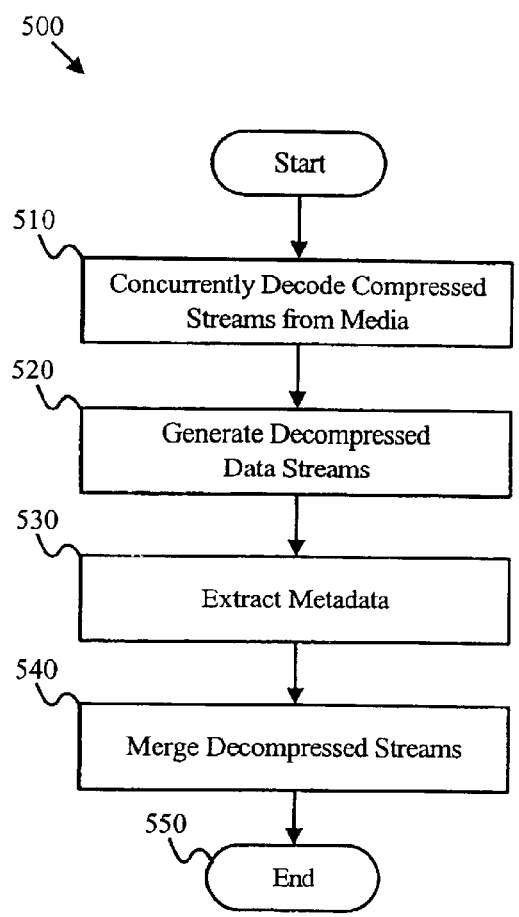
Fig. 4
Fig. 5

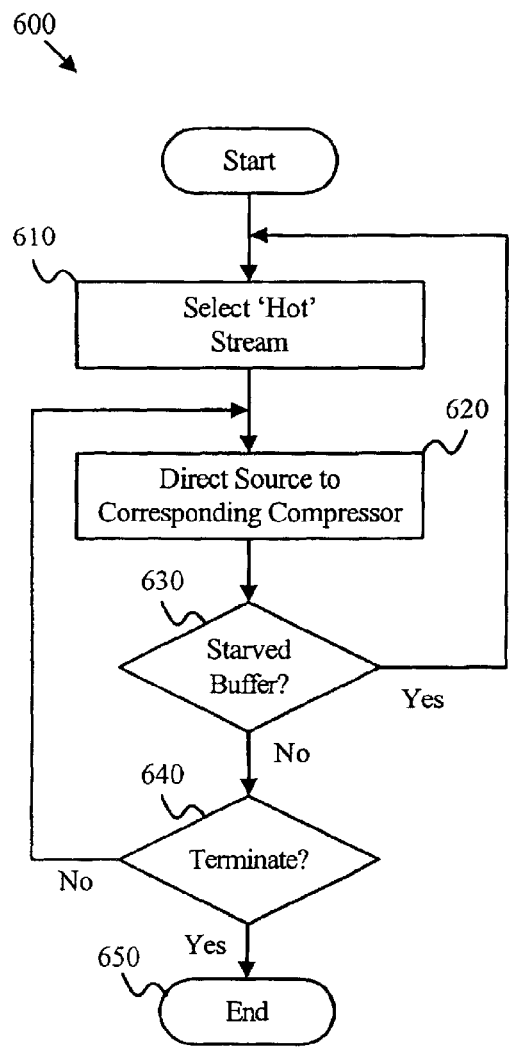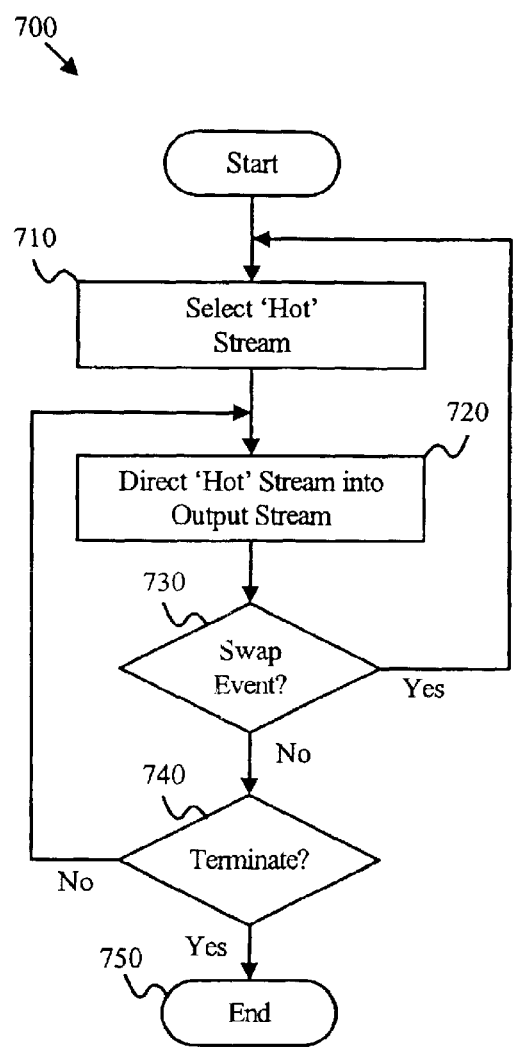
Fig. 6
Fig. 7

APPARATUS METHOD AND SYSTEM FOR INCREASED DIGITAL MEDIA RECORDING THROUGHPUT

BACKGROUND OF THE INVENTION

Field of the Invention

The present invention relates to digital media storage. Specifically, the invention relates to apparatus, methods, and systems for increasing recording throughput on digital media recording systems.

DESCRIPTION OF THE RELATED ART

Magnetic recording has played an important role in the electronic age for permanently storing and retrieving data. Magnetic recording media such as magnetic tape cartridges provide compact, reliable storage at a relatively low cost. In addition to storing data processing files, magnetic media have also been widely used to store data related to digital convergence such as digital music, video, photos, and personal data. Consumers and businesses have clearly benefited from the versatility of this constantly improving, media.

Despite the ubiquitous usage of magnetic storage, other types of storage such as flash memories have increased in popularity relative to magnetic storage. Part of the appeal of non-magnetic storage relates to the increased storage bandwidth or throughput available with such technologies albeit at a significantly higher cost per Megabyte of storage. What is needed are means and methods to improve the storage bandwidth of magnetic media systems.

One bottleneck on magnetic recording systems involves data compression—particularly context-based data compression of text and binary data files. FIG. 1 illustrates a block diagram of a typical prior art storage unit 100. The storage unit 100 includes a host interface 110, a compression module 120, a media interface 130, a recording medium 140, and a controller 150. The storage unit 100 illustrates some of the challenges related to increasing data compression bandwidth within digital media recording systems in general and of magnetic recording systems in particular.

The host interface 110 receives data 102 and commands 104 from a host or other computer-based system. Typically, the host interface directs the commands 104 to a control bus 106, and the data 102 to high-speed data bus 108, or the like. The controller 150 may receive the commands on the control bus 106 and direct operations related to recording data to or retrieving data from the recording medium 140.

The recording medium 140 is typically limited to a certain recording and retrieval rate for each track recorded on the recording medium 140. However, data throughput may be increased by recording and retrieving multiple tracks concurrently. As a result, many recording systems have increased the number of concurrently written tracks, the bandwidth of the media interface 130, and the aggregate data transfer rates associated therewith.

The compression module 120 compresses data and thereby potentially increases the effective throughput seen by the host to, and the capacity of, the storage unit 100 in that more information may be stored with less data written to media. However, the data transfer rates of the compression module 120 may be limited by semiconductor clock rates in that many compression algorithms, particularly context-based compression algorithms such as SLDC, compress on a byte boundary and thus are not readily extensible to compress more than one byte at a time. This is particularly problematic for data processing systems that rely heavily on context-based compression to compress text files, binary data files, and the like.

The limits of context-based compression algorithms place system designers in a quandary. On one hand, compression potentially increases the throughput and storage capacity of digital recording media such as magnetic media. On the other hand, compression places an upper bound on data transfer rates achievable with context-based compression.

What is needed are apparatus, means, and methods to increase the throughput achievable with digital recording media. In particular, what is needed are apparatus, methods, and systems to overcome the bottleneck currently associated with context-based compression within digital media recording systems.

BRIEF SUMMARY OF THE INVENTION

The present invention has been developed in response to the present state of the art, and in particular, in response to the problems and needs in the art that have not yet been fully solved by currently available digital recording means and methods. Accordingly, the present invention has been developed to provide an apparatus, method, and system to overcome many or all of the above-discussed shortcomings in the art.

In one aspect of the invention, an apparatus for increased recording throughput of digital media recorders includes a control module that distributes a source data stream to multiple compression paths that compress and buffer digital data to provide compressed data streams, and one or more media encoders that concurrently encode the compressed data streams to corresponding media tracks. In one embodiment, the control module monitors available buffer space within each compression path and distributes data to a selected compression path based on available buffer space. Each compression path may include a compression module that provides compressed data and a data buffer that buffers the compressed data.

In addition to distributing data to a selected compression path, the control module may initiate insertion of metadata within the compressed data streams that facilitate reconstruction of the source data stream from the corresponding set of compressed data streams. In certain embodiments, the metadata includes a swap command indicating selection of a particular compression path. The control unit may also adjust distribution of the source data stream based on feedback from a media encoder, such as skip events due to media defects on particular tracks, which slow or pause the throughput of one of the compression paths to media. The source data stream may be distributed in units large enough to maintain context and compressibility of the data.

In one embodiment, the media encoder encodes an active path identifier at each access point within the media tracks and each access point corresponds to a point in the compressed data stream that is context-free. The active path identifier identifies the active or 'hot' path from which the compressed data is preferably directed from for decompression. Placing an active path identifier at each access point facilitates decompressing data and reconstructing the original source data stream beginning at any access point.

In another aspect of the invention, an apparatus for increased retrieval throughput of digital media recorders includes one or more media decoders that concurrently decode multiple media tracks to provide a set of compressed data streams to a corresponding set of decompression paths that concurrently decompress and buffer the compressed data streams to provide a corresponding set of decompressed data streams, and a control module that merges the decompressed data streams into a merged data stream as directed by metadata contained within the compressed data streams. Each decompression path may include a decompression module that provides decompressed data and a data buffer that buffers the decompressed data.

In certain embodiments, the metadata comprises a swap command indicating selection of a particular decompression path. In one embodiment, the media decoder decodes an active or 'hot' path identifier at each access point within the media tracks in order to commence decompression beginning at any access point. In certain embodiments, the described functional units of the data recording and data retrieval units are merged into a single unit that streams data to and from a digital medium on parallel tracks in an efficient concurrent manner.

In one aspect of the invention, a method for increased recording throughput on digital media recorders includes distributing a source data stream to multiple compression paths to concurrently provide a corresponding set of compressed data streams, inserting metadata within the compressed data streams, and concurrently encoding the compressed data streams to media tracks. The metadata facilitates reconstruction of the source data stream from the compressed data streams. In certain embodiments, the method also includes monitoring available buffer space within each compression path, and distributing the compressed source data stream to a given path based on available buffer space within each compression path.

In one aspect of the invention, a method for increased retrieval throughput of digital media recorders includes concurrently decoding media tracks to provide corresponding compressed data streams, concurrently decompressing compressed data streams to provide decompressed data streams, and merging the decompressed data streams into a merged data stream as directed by metadata contained within the compressed data streams.

The present invention increases throughput of digital media recording systems by intelligently distributing a source data stream to multiple compression paths and inserting metadata within the resulting compressed data streams that facilitate reconstruction of the source data stream. The present invention adjusts to media defects and variations in data compressibility in a transparent manner. These and other features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 is a flow chart diagram illustrating one embodiment of at parallel compression method of the present invention;

FIG. 5 is a flow chart diagram illustrating one embodiment of a parallel decompression method of the present invention;

FIG. 6 is a flow chart diagram illustrating one embodiment of a data: stream distribution method of the present invention;

FIG. 7 is a flow chart diagram illustrating one embodiment of a data stream merging method of the present invention.

DETAILED DESCRIPTION OF THE INVENTION

It will be readily understood that the components of the present invention, as generally described and illustrated in the Figures herein, may be arranged and designed in a wide variety of different configurations. Thus, the following more detailed description of the embodiments of the apparatus, method, and system of the present invention, as represented in FIGS. 2 through 8, is not intended to limit the scope of the invention, as claimed, but is merely representative of selected embodiments of the invention.

Many of the functional units described in this specification have been labeled as modules, in order to more particularly emphasize their implementation independence. For example, a particular module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Alternatively, all modules may be part of one electronic package, such as a VLSI circuit.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
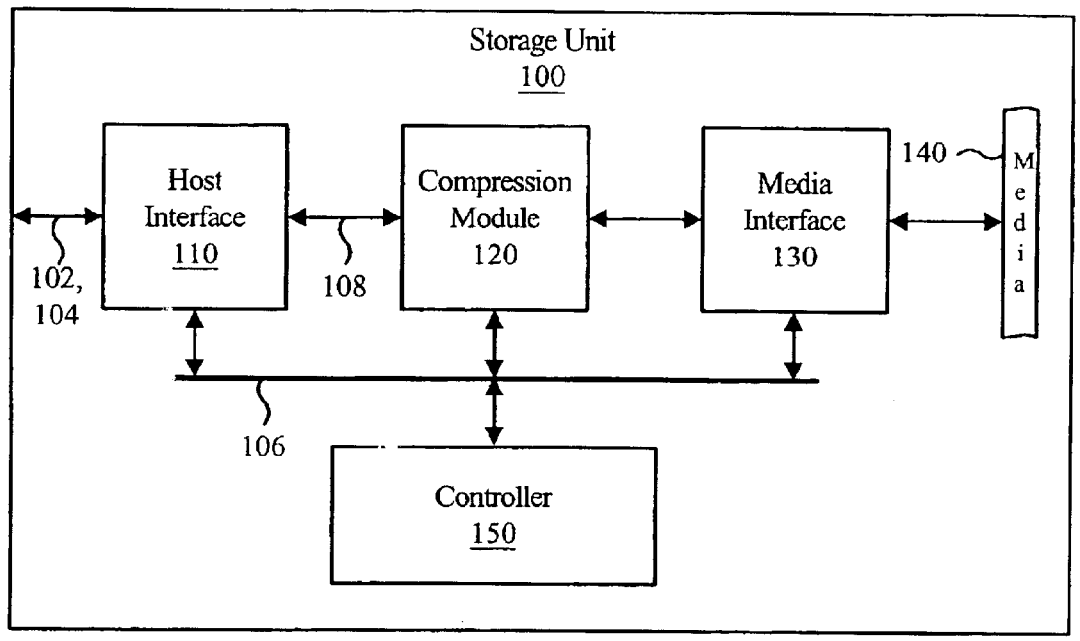
FIG. 1 is a block diagram illustrating a typical prior art storage unit.
Figure 2:
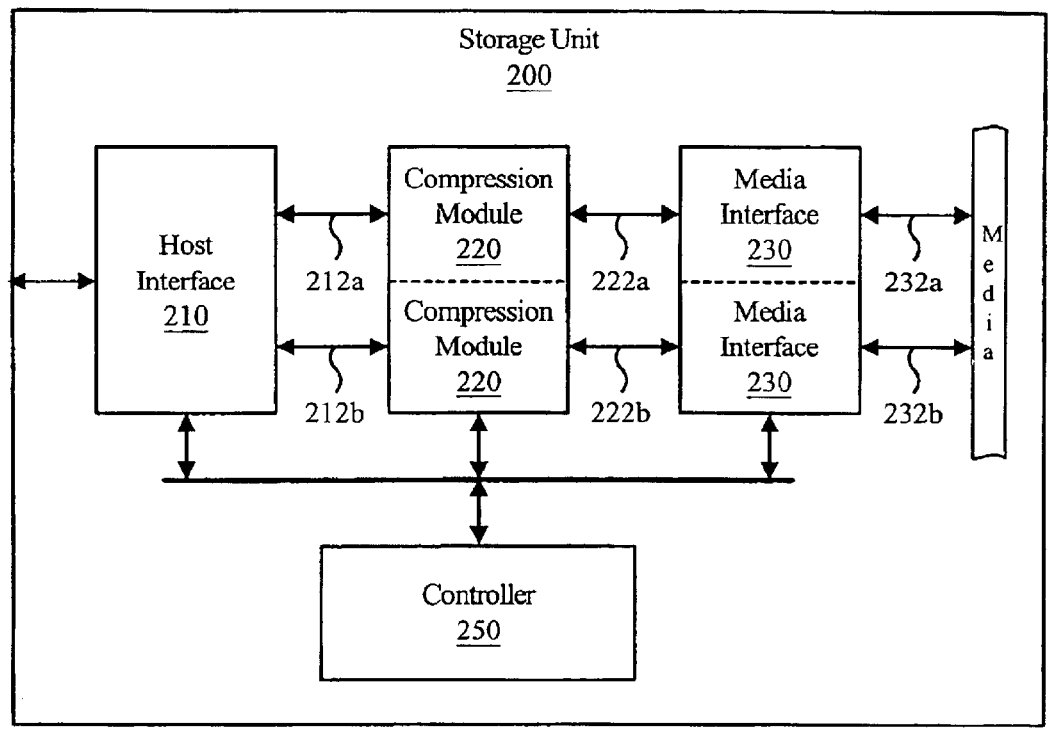
FIG. 2 is a block diagram illustrating an exemplary parallel compression storage unit.

FIG. 2 is a block diagram illustrating an exemplary parallel compression storage unit 200. The parallel compression storage unit 200 includes a host interface 210, two or more compression modules 220, two or more media interfaces 230, a recording media 240, and a controller 250. The parallel compression storage unit 200 illustrates several issues related to increasing data throughput of digital media recording systems.

The compression modules 220 and media interfaces 230 are depicted as supporting parallel data streams, namely, an uncompressed data stream 212a and 212b, a compressed data stream 222a and 222b, and an encoded data stream 232a and 232b. For purposes of simplicity, the streams are shown as bi-directional data streams corresponding to compression and decompression pathways for digitally recording and retrieving data on the recording media 240.

While the concept of parallel processing pathways may seem intrinsically useful for solving throughput problems on digital media recording systems, several issues must be addressed to make such a system truly useful. For example, one might assume that multiple independent data streams may be provided by a host, or the like, and written in parallel to the recording media 240 via the parallel compression pathways. However, multiple data streams may not be available for simultaneous recording. Many compression techniques have variable context-dependent compression ratios, resulting in bandwidth mismatches between the compression paths. Furthermore, data retrieval throughput rates would typically be dramatically reduced in that independent data streams are unlikely to be simultaneously accessed.

One might also assume that a single high-bandwidth data stream could be evenly distributed to the compression modules 220. However, the data presented to the compression modules 220 via paths 212a and 212b may not be equally compressible, resulting in bandwidth mismatches between the parallel pathways. Furthermore, distributing the data to the compression modules may significantly reduce the compressibility of the data stream, resulting in reduced system performance.

As depicted in subsequent FIGS. 3–8, the present invention provides means and methods to realize the potential of the parallel compression storage unit 200 in a practical efficient manner.

Figure 3:
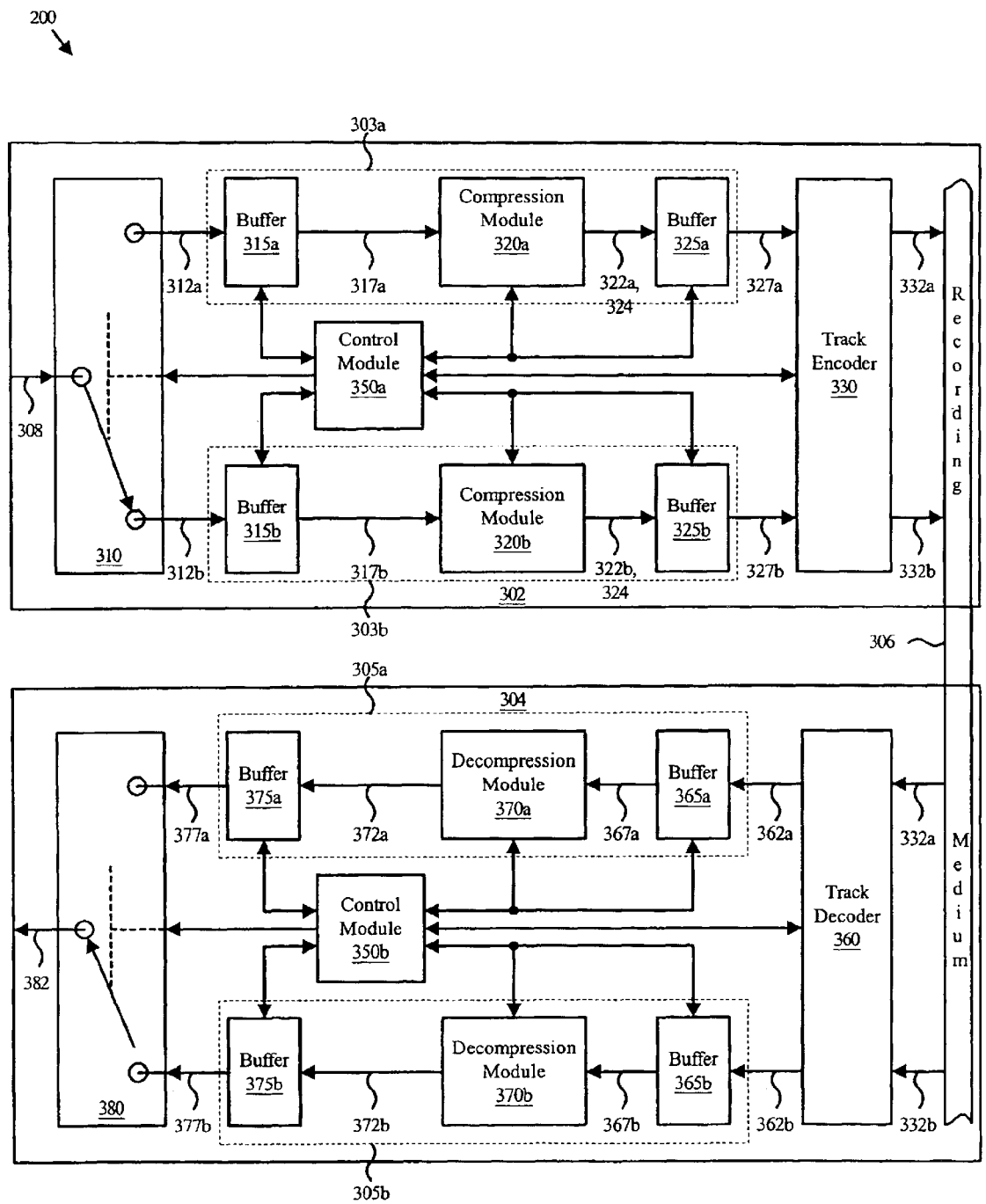
FIG. 3 is a block diagram illustrating one embodiment of a parallel compression digital media recording system of the present invention.

FIG. 3 is a block diagram illustrating one embodiment of a parallel compression digital media recording system 300 of the present invention. The parallel compression digital media recording system 300 includes a recording module 302, a retrieval module 304, and a recording medium 306. While depicted as separate modules, in certain embodiments the recording module 302 and the retrieval module 304 are merged into a single module capable of recording and retrieving data on the recording medium 306.

The depicted recording module 302 includes a data distributor 310, two or more compression paths 303, a track encoder 330, and a control module 350a. The depicted retrieval module 304 includes a track decoder 360, two or more decompression paths 305, a data collector 380, and a control module 350b. The depicted compression paths 303 each include a compression module 320, a buffer 315, and a buffer 325. The depicted decompression paths 305 each include a decompression module 370, a buffer 365, and a buffer 375. The control module 350a interfaces with the compression paths 303, while the control module 350b interfaces with the decompression paths 305. In one embodiment, the control module 350a and 350b are integrated into a single control module 350.

The data distributor 310 distributes a source data stream 308 to the compression paths 303 as directed by the control module 350a. Within each compression path 303, a buffer 315 provides a partitioned stream 317 to the compression module 320. In one embodiment, the source data stream 308 is provided to the buffers 315 in fixed-length units convenient to the compression modules 320. In the depicted embodiment, each compression module 320 compresses one of the partitioned streams 317 and provides one of the compressed data streams 322.

As depicted, the buffers 325 buffer the compressed data streams 322 to provide buffered data streams 327 to the track encoder 330. In one embodiment, data within the buffered data streams 327 are burst to the track encoder 330 upon request of the track encoder 330. The track encoder 330 encodes the buffered data streams 327 to provide a set of encoded tracks 332.

The control module 350a may monitor available space within the buffers 315 and 325 in order to direct the source data stream to any starved, or significantly less full, compression path 303. In addition, the control module 350a may insert or initiate insertion of metadata 324 into the compressed data streams 322 in response to changing the compression path for the source data stream 308. In one embodiment, the compression modules 320 insert metadata as directed by the control module 350a.

In certain embodiments, the track encoder 330 verifies the data written to segments of the tracks 332 in order to detect encoding errors, media defects, or the like. The track encoder 330 may rewrite or "skip" track segments associated with errors and defer writing a pending segment. In one embodiment, the track encoder informs the; control module 350a of skip events, and the control module 350a adjusts distribution of the source data stream 308 to compensate for skip events. In other embodiments, available space within the buffers 315 and 325 is directly monitored, and distributing the source data stream 308 to a starved compression path 303 automatically compensates for skip events.

As depicted, the track decoder 360 decodes the encoded tracks 332 to provide a set of compressed data streams 362. The decompression paths 305 decompress the compressed data streams 362 to provide a set of decompressed data streams 377. Within each decompression path 305, the buffers 365 and 375 provide data rate matching between the decompression module 370 and the other components of the retrieval module 304.

The collector 380 may merge the decompressed data streams 377 into a single output data stream 382. In response to metadata such as swap codewords embedded into the compressed data streams 362, the control module 350b may change the decompression path 305 from which the output data stream 382 is drawn.

In one embodiment, swap codewords (not shown) are passed from the compressed data stream 362 to the decompression module 370 where they are detected by a detection circuit (not shown) which informs the control module 350b. In response to detection of a swap codeword, the control module 350b connects the collector 380 to a different buffered data stream 377 and buffer 375. For example, in applications having two decompression paths, the active or 'hot' path may be switched or swapped to the other decompression path in response to detection of a swap codeword.

As depicted, the buffers 315, 325, 365, and 375 handle short-term variations in bandwidth of the data streams 317, 322, 367 and 372 respectively. Any long-term variations in bandwidth of the compressed data streams 322 and 372 are compensated for by the swapping pattern generated by the control module 350.

FIG. 4 is a flow chart diagram illustrating one embodiment of a parallel compression method of the present invention. The parallel compression method 400 includes a distribute step 410, a generate compressed streams step 420, an insert metadata step 430, and an encode streams step 440. The parallel compression method 400 may be conducted in conjunction with the recording module 302, or the like.

The distribute step 410 distributes a source data stream to multiple compression paths or modules. In one embodiment, the source data stream is distributed in discrete units large enough to maintain compressibility of the source stream data. The generate compressed streams step 420 concurrently compresses the data distributed to the multiple compression paths or modules and thereby generates multiple compressed data streams. Concurrently compressing the data increases the throughput of the parallel compression method 400.

The insert metadata step 430 inserts metadata into the compressed data streams. The metadata facilitates reconstruction of the source data stream from the compressed data streams. The metadata may include a swap codeword indicating a change in the 'hot' compression path i.e. the compression path which is currently receiving the source data stream. In certain embodiments, such as embodiments involving more than two compression paths, the swap codeword includes an active (i.e. 'hot') path identifier.

The encode streams step 440 encodes the compressed data streams to write corresponding tracks or sets of tracks on a recording media. In certain embodiments, the tracks are concurrently encoded. In response to completion of the encode streams step 440, the depicted method 400 ends 450. While the depicted parallel compression method 400 is shown as a series of sequential steps, one of skill in the art will appreciate that such a method may be concurrently and continuously conducted—for example on a magnetic storage unit containing circuitry dedicated to conducting each step of the depicted method 400, in a parallel pipelined architecture. Alternatively, various steps such as the generate compressed streams step 420 and the insert metadata step 430 may be performed by the same hardware or software. Specific steps may also be conducted in a different order than the depicted order. For example, the insert metadata step 430 may effectively be performed before the generate compressed streams step 420.

FIG. 5 is a flow chart diagram illustrating one embodiment of a parallel decompression method 500 of the present invention. The parallel decompression method 500 includes a decode streams step 510, a generate decompressed streams step 520, an extract metadata step 530, and a merge streams step 540. The parallel decompression method 500 may be conducted in conjunction with the retrieval module 304, or the like.

The decode streams step 510 decodes a set of compressed data streams from corresponding tracks or sets of tracks on a recording media. In certain embodiments, the tracks are concurrently decoded. The generate decompressed streams step 520 concurrently decompresses the data retrieved from the recording media and thereby generates multiple decompressed data streams. Concurrently decompressing the data increases the throughput of the parallel decompression method 500.

The extract metadata step 530 extracts metadata from the compressed or decompressed data streams. The metadata facilitates reconstruction of the original data stream from the decompressed data streams. The metadata may include a swap codeword indicating a change in the 'hot' decompression path—the decompression path that is currently providing data to the reconstructed data stream. In certain embodiments, such as embodiments involving more than two decompression paths, the swap codeword includes an active ('hot') path identifier.

The merge streams step 540 merges the decompressed data streams into the reconstructed data stream. In certain embodiments, the merge streams step 540 includes transferring data from the active or hot decompression path (as indicated by metadata) to a medium, such as a data bus or transmission link, bearing the reconstructed data stream. In response to completion of the merge streams step 540, the depicted method 500 ends 550. Similar to the parallel compression method 400, the parallel decompression method 500 may be concurrently and continuously executed on hardware configured for concurrent processing such as hardware having a pipelined processing architecture. Specific steps may also be conducted in a different order than the depicted order. For example, the extract metadata step 530 may effectively be performed before the generate decompressed streams step 520.

FIG. 6 is a flow chart diagram illustrating one embodiment of a data stream distribution method 600 of the present invention. The distribute method 600 includes a select hot stream step 610, a direct source step 620, a starved buffer test 630, and a terminate test 640. The distribute step 600 is one embodiment of the data stream distribution step 410 of FIG. 3.

The select hot stream step 610 selects a particular destination data stream for reception of data from a source data stream. In one embodiment, the selected destination data stream is initially a default data stream until a starved destination data stream is detected. In certain embodiments, the data streams are segmented into blocks and a change in the selected destination data stream occurs only on a block boundary. In response to selection of the destination data stream, the direct source step 620 directs the source data stream to a compressor or compression path corresponding to the selected destination data stream.

The starved stream test 630 ascertains whether any destination data streams are starved for data. In certain embodiments, buffers corresponding to the destination data streams are queried as to the amount of available buffer space, and computations are conducted to determine if a starved stream exists. In one embodiment, the difference in available space is computed and a data stream is considered starved if the available space on another destination data stream exceeds its own buffer space by a certain threshold value. The aforementioned technique balances the available bandwidth and ensures that both buffers run empty nearly simultaneously under starvation conditions.

If the starved stream test 630 ascertains that a destination data stream is starved, the data stream distribution method 600 loops to the select hot stream step 610. If none of the destination data streams are starved the method proceeds to the terminate test 640. The terminate test 640 determines whether termination of processing has been requested. If termination of processing has been requested the data stream distribution method 600 ends 650. If termination of processing has not been requested, the method loops to the direct source step 620 and continues to direct data to the selected or hot destination data stream.

FIG. 7 is a flow chart diagram illustrating one embodiment of a data stream merging method 700 of the present invention. The merge streams step 700 includes a select stream step 710, a merge stream step 720, a swap stream test 730, and a terminate test 740. The data stream merging method 700 merges two or more decompressed data stream into a reconstructed or output data stream that is identical to an original source data stream. The data stream merging method 700 is one embodiment of the merge streams step 540 depicted in FIG. 5.

The select hot stream step 710 selects the active or hot data stream from a set of decompressed data streams. In one embodiment, the active or hot data stream is selected by decoding an active path identifier encoded at an access point on a recording medium or by receiving metadata explicitly or implicitly indicating an active or hot decompression path.

The merge stream step 720 merges the selected decompressed data stream into the output data stream. In one embodiment, the merge stream step 720 includes transferring data from the active or hot data stream to a medium bearing the reconstructed data stream.

The swap stream test 730 ascertains whether a possible swap event has occurred. In one embodiment, possible swap events include a swap codeword embedded in the hot data stream or a seek event on a recording medium. If a possible swap event has occurred, the method loop to the select hot stream step 710. If a possible swap event has not occurred, the method proceeds to the terminate test 740.

The terminate test 740 determines whether termination of processing has been requested. If termination of processing has been requested the data stream merging method ends 750. If termination of processing has not been requested, the method loops to the merge stream step 720 and continues to merge data from the selected decompressed data stream into the output data stream.

Figure 8:
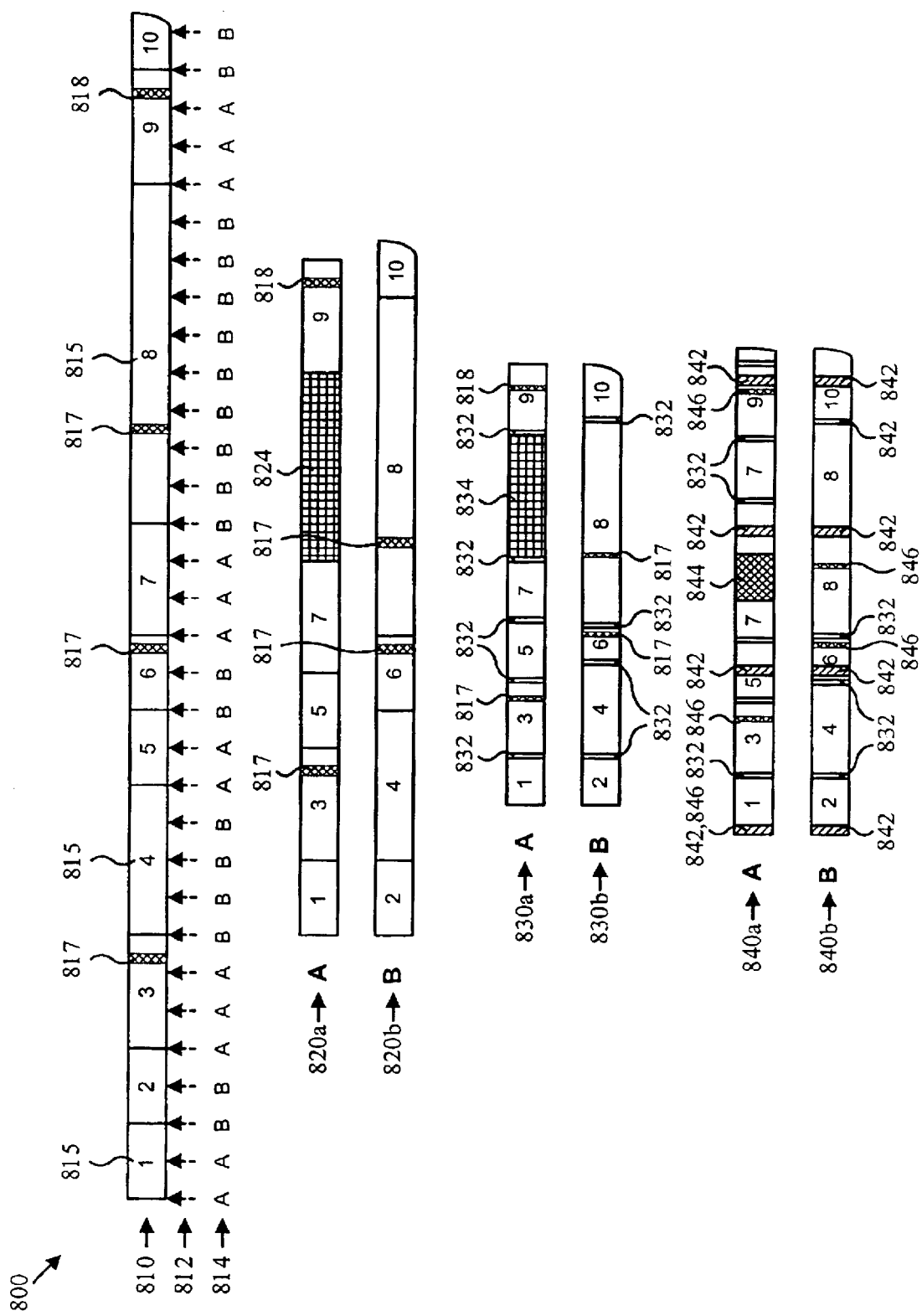
FIG. 8 is a data diagram showing the relationship of various data streams exemplary of one embodiment of the present invention.

FIG. 8 is a data diagram 800 showing the relationship of various data streams exemplary of one embodiment of the present invention. The data diagram 800 includes a source data stream 810 segmented into numbered streamlets 815, two distributed streams 820, two compressed stream 830, and two encoded streams 840. Also shown are device block boundaries 812, path or stream selections 814, record boundaries 818, swap codewords 832, inter-block gaps 842, access points 846, idle intervals 824 and 834, and a media defect 844.

In the depicted embodiment, the hot (i.e. starved) compression path or stream is subject to change at each block boundary 812. The path selections 814 indicate the path to which the source data stream is directed. Directing the source data stream to the indicated path selections results in the distributed streams 820. The distributed streams 820 are each processed by a compression module or path to produce the compressed data streams 830 including metadata such as the swap codewords 832 inserted by the control module 350 or the like.

In the depicted scenario, the track encoders 330, or the like, receive the compressed data streams 830 and package the compressed data into device blocks separated by inter-block gaps 842. The access points 846 are placed at positions, or point to positions, within the encoded streams 840 from which decompression and data stream reconstruction may commence. The access points 846 may include an active path identifier to facilitate decompression and reconstruction from that particular point. For context-independent compressed data, the access points may be located at any useful location such as a block boundary.

In certain embodiments involving context-based compression, such as SLDC compression in which a history buffer is needed to conduct decompression, the access points 846 are placed at context-free locations such as record boundaries 817 or EOF markers 818 to guarantee a position at which decompression and stream reconstruction may begin. In the aforementioned embodiments, padding bits may be inserted into the encoded stream to align the compressed data stream with the access point.

In the event of a media defect 844 or other error, data may be rewritten resulting in a skip event and a possible idle interval on the corresponding compression path and stream. For example, in the depicted scenario the media defect 844 results in the idle interval 824 within the distributed stream 820a, and the idle interval 834 within the compressed data stream 830a.

The present invention facilitates software development and testing in general and isolation, replication, and analysis of software errors in particular. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for increased data throughput of digital media recorders, the apparatus comprising:

a control module configured to distribute a source data stream to a plurality of compression paths;

the plurality of compression paths configured to compress and buffer digital data to provide a plurality of compressed data streams;

at least one media encoder configured to concurrently encode the plurality of compressed data streams on a plurality of media tracks; and the control module further configured to initiate insertion of metadata within the compressed data streams, the metadata configured to facilitate reconstruction of the source data stream from the compressed data streams.

2. The apparatus of claim 1, wherein the at least one media encoder is further configured to encode an active path identifier at an access point within the plurality of media tracks.

3. The apparatus of claim 1, wherein the metadata comprises a swap command indicating selection of another compression path.

4. The apparatus of claim 1, wherein the control module is further configured to monitor available buffer space within each compression path.

5. The apparatus of claim 1, wherein the control module is further configured to distribute data to a selected compression path based on available buffer space within each compression path of the plurality of compression paths.

6. The apparatus of claim 1, wherein the control unit is further configured to adjust distribution of the source data stream in response to media defects on particular media tracks.

7. The apparatus of claim 1, wherein each compression path of the plurality of compression paths comprises a compression module configured to compress data and a buffer configured to buffer data.

8. An apparatus for increased data throughput of digital media recorders, the apparatus comprising:

at least one media decoder configured to concurrently decode a plurality of media tracks to provide a plurality of compressed data streams;

a plurality of decompression paths configured to concurrently decompress and buffer the plurality of compressed data streams to provide a plurality of decompressed data streams; and a control module configured to merge the plurality of decompressed data streams into a merged data stream as directed by metadata contained within the plurality of compressed data streams.

9. The apparatus of claim 8, wherein the at least one media decoder is further configured to decode an active path identifier at an access point within the plurality of media tracks.

10. The apparatus of claim 8, wherein the metadata comprises a swap command indicating selection of another decompression path.

11. The apparatus of claim 8, wherein each decompression path of the plurality of decompression paths comprises a decompression module configured to decompress data and a buffer configured to buffer data.

12. A method for increased data throughput on digital media recorders, the apparatus comprising:

distributing a source data stream to a plurality of compression paths to concurrently provide a plurality of compressed data streams;

inserting metadata within the compressed data streams, the metadata configured to facilitate reconstruction of the source data stream from the compressed data streams; and concurrently encoding the plurality of compressed data streams on a plurality of media tracks.

13. The method of claim 12, further comprising monitoring available buffer space within each compression path.

14. The method of claim 12, wherein distributing the source data stream is based on available buffer space within each compression path.

15. The method of claim 12, further comprising adjusting distribution of the source data stream in response to media defects on particular media tracks.

16. A method for increased data throughput of digital media recorders, the method comprising:

concurrently decoding a plurality of media tracks to provide a plurality of compressed data streams;

concurrently decompressing the plurality of compressed data streams to provide a plurality of decompressed data streams; and merging the plurality of decompressed data streams into a merged data stream as directed by metadata contained within the plurality of compressed data streams.

17. An apparatus for increased data throughput on digital media recorders, the apparatus comprising:

means for distributing a source data stream to a plurality of compression paths to concurrently provide a plurality of compressed data streams;

means for inserting metadata within the compressed data streams, the metadata configured to facilitate reconstruction of the source data stream from the compressed data streams; and means for concurrently encoding the plurality of compressed data streams on a plurality of media tracks.

18. An apparatus for increased data throughput on digital media recorders, the apparatus comprising:

means for concurrently decoding a plurality of media tracks to provide a plurality of compressed data streams;

means for concurrently decompressing the plurality of compressed data streams to provide a plurality of decompressed data streams;

means for merging the plurality of decompressed data streams into a merged data stream as directed by metadata contained within the plurality of compressed data streams.

19. A computer readable storage medium comprising computer readable program code for increased data throughput of digital media recorders, the program code configured to conduct a method comprising:

distributing a source data stream to a plurality of compression paths to provide a plurality of compressed data streams;

concurrently encoding the plurality of compressed data streams on a plurality of media tracks; and inserting metadata within the compressed data streams, the metadata configured to facilitate reconstruction of the source data stream from the compressed data streams.

20. The computer readable storage medium of claim 19, wherein the method further comprises monitoring available buffer space within each compression path.

21. The computer readable storage medium of claim 19, wherein distributing the source data stream is based on available buffer space within each compression path.

22. The computer readable storage medium of claim 19, wherein the method further comprises adjusting distribution of the source data stream in response to media defects on particular media tracks.

23. A computer readable storage medium comprising computer readable program code for increased data throughput of digital media recorders, the program code configured to conduct a method comprising:

concurrently decoding a plurality of media tracks to provide a plurality of, compressed data streams;

decompressing the plurality of compressed data streams to provide a plurality of decompressed data streams; and merging the plurality of decompressed data streams into a merged data stream as directed by metadata contained within the plurality of compressed data streams.

24. A system for increased data throughput of digital media recorders, the apparatus comprising:

a control module configured to distribute a source data stream to a plurality of compression paths;

the plurality of compression paths configured to compress and buffer digital data to provide a plurality of compressed data streams;

at least one media encoder configured to concurrently encode the plurality of compressed data streams on a plurality of media tracks;

the control module further configured to initiate insertion of metadata within the compressed data streams, the metadata configured to facilitate reconstruction of the source data stream from the compressed data streams;

at least one media decoder configured to concurrently decode a plurality of media tracks to provide a plurality of compressed data streams;

a plurality of decompression paths configured to concurrently decompress and buffer the plurality of compressed data streams to provide a plurality of decompressed data streams; and the control module configured to merge the plurality of decompressed data streams into a merged data stream as directed by metadata contained within the plurality of compressed data streams.

25. The system of claim 24, wherein the at least one media encoder is further configured to encode an active path identifier at an access point within the plurality of media tracks.

26. The system of claim 24, wherein the metadata comprises a swap command indicating selection of another compression path.

27. The system of claim 24, wherein the control module is further configured to monitor available buffer space within each compression path.

28. The system of claim 24, wherein the control unit is further configured to adjust distribution of the source data stream in response to media defects on particular media tracks.

29. The system of claim 24, wherein the at least one media decoder is further configured to decode an active path identifier at an access point within the plurality of media tracks.

30. The system of claim 24, wherein each decompression path of the plurality of decompression paths comprises a decompression module configured to decompress data and a buffer configured to buffer data.

* * * * *